United States Patent [19]

Nemirovsky

[11] Patent Number: 4,938,489
[45] Date of Patent: Jul. 3, 1990

[54] SELF-CENTERING HOLDER FOR OPTICAL DEVICES AND THE LIKE

[75] Inventor: Robert Nemirovsky, 1117 Hyman Ave., Bayshore, N.Y. 11706

[73] Assignees: Robert Nemirovsky, Bay Shore; Joseph Deutsch, Commack, both of N.Y.

[21] Appl. No.: 286,733

[22] Filed: Dec. 20, 1988

[51] Int. Cl.⁵ .............................................. B23B 31/12
[52] U.S. Cl. ...................... 279/1 L; 279/33; 279/35; 269/156; 269/254 CS; 269/238
[58] Field of Search .................. 279/1 L, 35, 106, 156, 279/33; 269/153, 154, 156, 254, 238; 51/217 T; 33/644, 645, 676, 573; 350/252, 257, 246

[56] References Cited

U.S. PATENT DOCUMENTS

| 474,312 | 5/1892 | Abbot | 279/33 |
| 1,455,017 | 5/1922 | Axelson | 269/156 |
| 1,531,377 | 10/1922 | Clarke | |
| 2,444,457 | 7/1948 | Marks et al. | 279/35 |
| 2,762,630 | 9/1956 | Coniglio | 279/33 |
| 2,918,097 | 12/1959 | Thompson | 269/156 |
| 4,062,030 | 12/1977 | Starp | 350/257 X |
| 4,083,547 | 4/1978 | Gurley | 269/156 |
| 4,173,324 | 11/1979 | Rudmann | 244/161 |
| 4,222,577 | 9/1980 | Giffin | 279/114 |

FOREIGN PATENT DOCUMENTS 232408 8/1944 Switzerland ..................... 279/33

OTHER PUBLICATIONS

Melles Griot Optial Guide 4, pp. 21-19, 1984.
Newport Catalog with Applications No. 100, pp. D-26 and D-27.
Klinger Scientific Catalog 588, p. 176.

Primary Examiner—Z. R. Bilinsky
Assistant Examiner—R. Schultz
Attorney, Agent, or Firm—Kane, Dalsimer, Sullivan, Kurucz, Levy, Eisele and Richard

[57] ABSTRACT

A holder for an optical device such as a lens includes a frame and a plurality of arms pivotably attached to the frame. A resilient member urges the arms toward a closed position in which the arms meet at a common center within the frame. Linking members insure that the arms move simultaneously. The arms are moved away from the common point to accept and secure the optical device.

2 Claims, 2 Drawing Sheets

SELF-CENTERING HOLDER FOR OPTICAL DEVICES AND THE LIKE

BACKGROUND OF THE INVENTION a. Field of Invention

This invention pertains to a holder of optical devices such as lenses or other similar objects, and more particularly, to a holder for securing and maintaining objects precisely in a preselected position with respect to a reference axis.

b. Description of the Prior Art

It is frequently desirable to hold objects securely in a particular position with respect to a reference axis. For example in the fields of optics and lasers it is often necessary to hold an optical lens precisely aligned with the longitudinal axis of a light beam. Therefore optical holders mounted conventionally must hold lenses having different diameters at a preselected height and at the same time allow lenses to be quickly interchanged. For the sake of brevity, only lenses are discussed throughout the rest of this specification, it being understood that the same considerations discussed herein are also applicable to numerous other optical devices such as mirrors, beam splitters, and so forth). Heretofore holders for lenses or similar optical devices, and particularly holders in which lenses were interchangeable were expensive. Furthermore the process for changing the lenses was time consuming. In fact, many lens holders presently available are capable of holding lenses having a relatively small range of diameters. Thus several separate holders of various sizes must be acquired. For example in Melles Griot Optics Guide 4, published in 1988 by Melles Griot 1770 Kettering Street, Irvine, Calif. 92714 , page 21–19, two lens holder models are shown: one for lenses having diameters of 5 mm to 25 mm, and a second for lenses in the range of 25 mm to 80 mm diameter.

Similarly Newport Catalog with Applications No. 100, published by the Newport Corporation, P.O. Box 8020, 18235 Mt. Baldy Circle, Fountain Valley Calif. 92728–8020, shows on page D-27 two self-centering lens holders, one for lenses of up to 1", and second for lenses up to 2"in diameter. A plastic Universal Optic Holder is shown on page D-26 of the same catalog.

In Klinger Scientific Catalog 588, published by Klinger Scientific, 999 Stewart Avenue, Garden City, N.Y. 11530, page 176 shows a lens holder for holding lenses having diameters in the range of 10–100 mm.

All the above holders are based on a coaxial ring concept. where the rotation of a frame ring is transmitted to a linear movement of a plurality of pins disposed in grooves. This linear movement results in the pivoting of a plurality of optical support arms. This type of mechanism requires very precise manufacturing. Furthermore after extensive usage, the grooves wear away so that the movement of the arms becomes uneven and the lens cannot be positioned with a precise alignment.

OBJECTIVES AND SUMMARY OF THE INVENTION

In view of the above disadvantages of the prior art, it is an objective of the present invention to provide a holder which can position lenses and other similar articles precisely with respect to a reference axis.

Another objective is to provide a lens holder which can hold lenses having a relatively large range of diameters.

A further objective of the invention is to provide an arrangement with an actuating lever or trigger, whereby the movement of the trigger is transmitted directly to the optical support arms to rotate said arms around their corresponding fulcrums without any intermediate motions.

Yet a further objective of the invention is to provide a lens holder which maintains its accuracy despite extensive usage.

Other objectives and advantages of the invention shall become apparent from the following description of the invention A holder constructed in accordance with this invention comprises a frame, a plurality of arms pivotably secured to the frame, and linking means connected to the arms for moving the arms simultaneously by the same angle. The arms have arm ends which in one position are disposed adjacent to a common point within the frame. The arms may be separated to accept a lens or other similar optical device, and hold the lens with its center coincident with the common point which is preferably disposed at the center of the lens holder.

It has been discovered that arms pivoted around pins have greater load capacity, stability and longer life than arms actuated by pins moving linearly in grooves. Furthermore, a lens holder constructed in accordance with this invention has fewer parts and is simpler to manufacture then the devices described above.

DETAILED DESCRIPTION OF THE INVENTION

Figure 1:
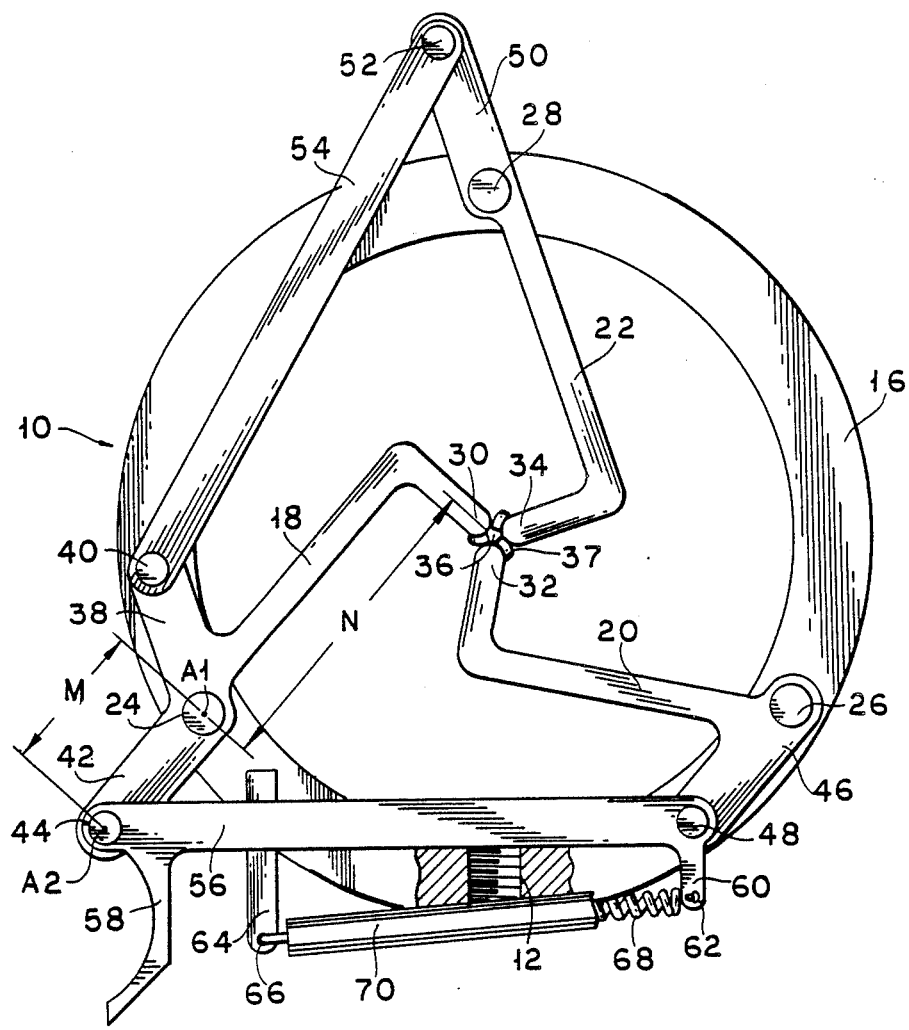
FIG. 1 shows a plan view of a lens holder constructed in accordance with this invention in a closed position.
Figure 2:
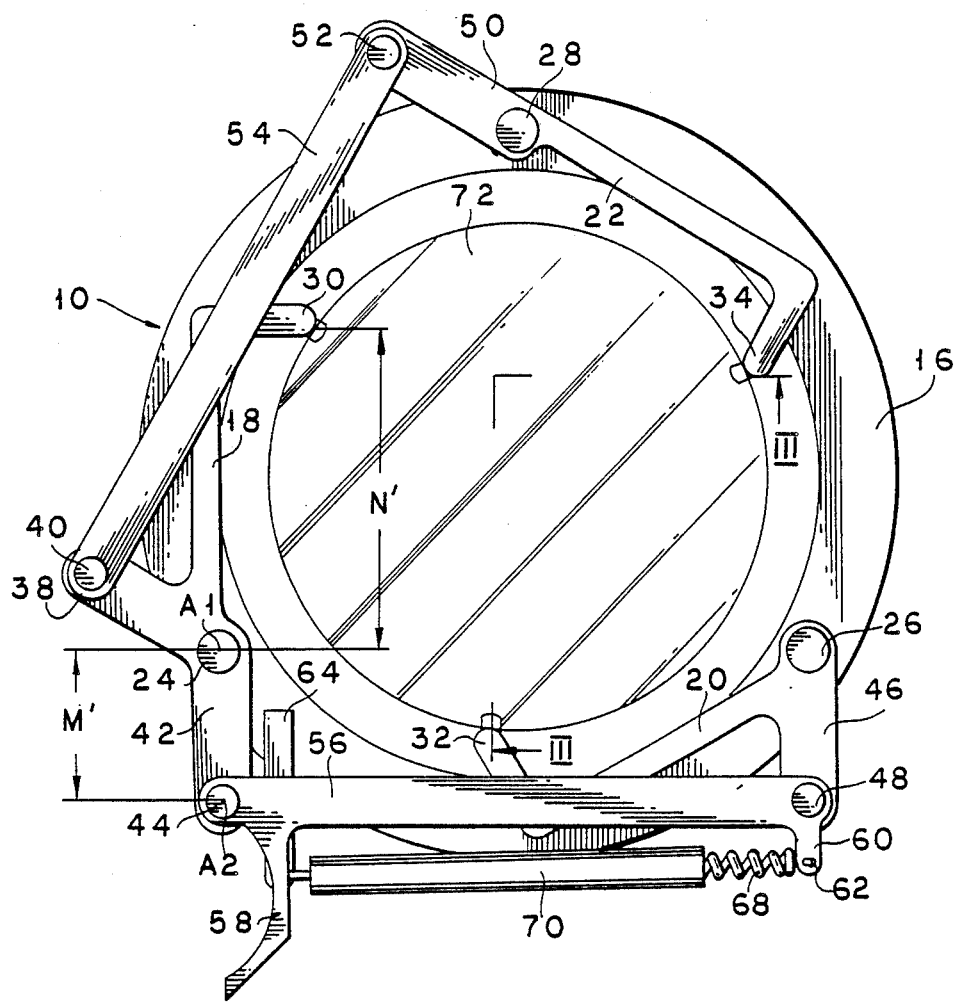
FIG. 2 shows the holder of FIG. 1 engaging lens.
Figure 3:
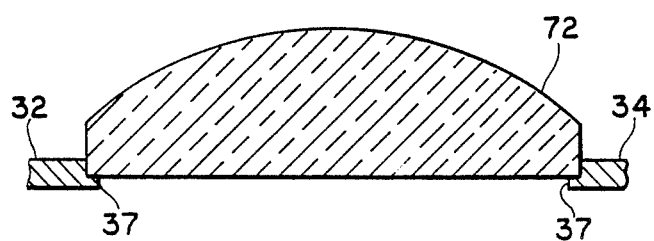
FIG. 3 shows a sectional view of the arms holding a lens, taken along line 2—2, in FIG. 2

Referring now to FIGS. 1–3, a lens holder 10 constructed in accordance with this invention comprises a frame 16 which is preferably ring-shaped, with a threaded hole 12. The frame may be mounted on a rod (not shown) threaded into hole 12 or on a riser block (not shown) in a manner well known in the art. Alternatively. the holder may be mounted on a base in any other manner without affecting its operation as shall become obvious from the following description.

A plurality of arms 18, 20, 22 are pivotably mounted on the frame 16 by corresponding pins 24, 26, 28. Alternatively, the arms could be pivotably mounted on frame 16 by screws threaded into corresponding holes within the frame. The longitudinal axis of the pins defines a pivoting axis or fulcrum for the arms 18, 20, 22. The pins 24, 26, 28 are equidistant from each other having an angle of 120 degrees between their axes to insure that the lens is automatically centered independently of its diameter. The arms have inner ends 30, 32, 34 which in FIG. 1 are shown disposed adjacent to each other and to center 36 of the frame 16. The portion of each arm extending from the corresponding inner end to the pin, such as for example the portion of arm 18 extending from inner end 30 to pin 24, is approximately L-shaped with the shorter leg of the L being disposed closer to the common center 36 then the longer leg. The inner ends 30, 32, 34 are generally rounded and are provided with a shoulder 37 for engaging and providing a back support for a lens 72.

Arm 18 has one extension 38 terminating in a coupling pin 40, and a second extension 42 terminating in a pin 44. The two extensions are disposed at an angle of 60 degrees. Arm 20 has a single extension 46 terminating in a coupling pin 48. There is an angle of 60 degrees between arm 20 and extension 46. Finally arm 22 has an extension 50 terminating in coupling pin 52. Between pin 40 and 52 there is a linking bar 54, and between pins 44 and 48 there is another linking bar 56. (The coupling pins b may be replaced by threaded screws if desired.) The linking bars are connected pivotably by the corresponding pins and are provided for interlocking the arms so that all the arms 18, 20, 22 are pivoted simultaneously around corresponding pins 24, 26, 28, when at least one of the arms is pivoted by an external means such as actuating trigger 58.

Linking bar 56 has a downwardly extending trigger 58 at one end, and a downward extension 60 at the other end terminating in a hole 62. Adjacent to trigger 58, frame 12 has an extension 64 terminating in a hole 66. Between holes 62 and 66 there is a resilient means such as a coil spring 68 which is pre-strained during assembly, and which urges the arms in the clockwise direction toward a closed position shown in FIG. 1. The protective sleeve 70 may be slidably mounted on the spring 68. When the trigger 58 is shifted to the right, as shown by the arrow in FIG. 1, the arms simultaneously pivot counterclockwise, with their inner ends swinging uniformly counterclockwise from the common center 36.

The above-described structure was found to be most convenient when the holder is mounted vertically on a rod, with the trigger being movable approximately horizontally. It should be understood that for other orientations, the trigger 58 and spring 68 may be coupled to any other arm or link. Alternatively, other means having different shapes may be used as required to pivot the arms around their corresponding fulcrums.

For self-centering of the lens in the lens holder, the following criteria should be used:

(1) The length N between the arm fulcrum A1 and the contact area of this arm with the lens perimeter must be the same for all the arms.

(2) The distance M between the arm fulcrum A1 the axis of the coupling pin A2 for all the arms must be the same.

It should be noted that the distance N changes for lenses of different diameter as shown at N' in FIG. 2, however it is still the same for all three arms.

The operation of the lens holder shall now be described for the configuration of FIGS. 1 and 2. When the holder 10 is not in use, the inner ends of the arms are held in the closed position shown in FIG. 1 by spring 68. The arms are opened by pulling the trigger 58 to the right. The arms and the linking bars are arranged and dimensioned so that as the trigger is pulled to the right, the arms are pivoted counterclockwise simultaneously by the same angle around their fulcrums, so that the arm ends 30, 32, 34 are always at the same distance from each other and from the common center 36. After the arms have been pivoted sufficiently counterclockwise, a lens or other optical device may be placed between the arm ends. When the trigger is allowed to return under the influence of spring 68, the arm ends engage the perimeter of the lens and hold it securely. After the trigger is released, the lens remains secured to the holder by the force of spring 68. One skilled in the art will appreciate that the L-shaped arms are arranged and constructed so that they substantially do not extend into the inner region of the frame 16. This feature of the invention permits the holder to accommodate lenses having an external diameter only slightly smaller than the inner diameter of frame 16. Importantly, the structure and orientation of the arms assures that the center of the lens being positioned automatically coincides with the common center 36, as shown for lens 72 in FIG. 2.

The arms of lens holder of FIGS. 1-3 may have for example a square cross-section of about 0.187' and the free ends may be terminated by a section having a reduced thickness of about 0.156" with a thickness at the shoulder of about 0.031". A holder with these dimensions and a frame aperture of 4.00" may be used to support lenses of up to 0.5" thickness, and diameters in the range of 3/32" to 4". For thicker lenses, the arms may be provided with rods, screws or other support means well-known in the art. If there is need to hold and center optical elements having a diameter exceeding 4.00", a holder with a larger frame aperture can be made.

The shoulder 37 may be formed integrally with the arm or it may be secured to the arm. The arm itself and its inner ends can have a variety of other shapes besides the L-shape described above. For example, the arm may be straight and may have a side surface arranged to engage the lens.

Obviously numerous alterations and modifications may be made to the invention without departing from its scope as defined in the appended claims.

I claim:

1. An optical holder comprising:
a frame;
a first, a second and a third arm, each of said arms being pivotally mounted on said frame and including an arm end;
a first linking bar pivotally attached to said first and second arms;
a second linking bar pivotally attached to said first and third arms;
said arms and said pivot attachments being arranged to pivot said arms by an angular movement of either of said linking bars, said arms being pivoted between a first open position in which said arm ends are spaced apart and a second closed position in which said arm ends come together adjacent to a common point;
spring means arranged between one of said linking bars and said frame to urge said arm ends toward said second closed position; and
actuating means coupled to one of said first and said second linking bars for achieving angular movement of said one linking said bar to pivot said arms.

2. The optical holder of claim 1 wherein said actuating means comprises an actuating trigger integral with said one of said first and second linking bars.

* * * * *